United States Patent [19]

Mayer, Emil

[11] Patent Number: 4,959,937
[45] Date of Patent: Oct. 2, 1990

[54] GLASS BLOCK PANEL CONSTRUCTION AND DEVICE FOR USE IN SAME

[76] Inventor: Mayer, Emil, 30 Timber La., Manhasset, N.Y. 11030

[21] Appl. No.: 253,008

[22] Filed: Oct. 4, 1988

Related U.S. Application Data

[63] Continuation-in-part of Ser. No. 863,664, May 15, 1986, Pat. No. 4,774,793, which is a continuation-in-part of Ser. No. 843,483, May 14, 1986, abandoned.

[51] Int. Cl.$^5$ .............................................. E04G 21/18
[52] U.S. Cl. ........................................ 52/308; 52/306; 52/442; 52/509; 403/403
[58] Field of Search .................... 52/306–309, 52/136, 137, 442, 444, 509, 604, 744, 741, 747; 403/255, 295, 403

[56] References Cited

U.S. PATENT DOCUMENTS

| | | | |
|---|---|---|---|
| 2,227,842 | 1/1941 | Polivka | 52/308 |
| 4,058,943 | 11/1977 | Sturgill | 52/307 X |
| 4,774,793 | 10/1988 | Mayer | 52/308 |

Primary Examiner—Richard E. Chilcot, Jr.
Attorney, Agent, or Firm—Pennie & Edmonds

[57] ABSTRACT

Architectural glass block walls or panels are constructed by assembling a plurality of blocks using connectors which provide securement and uniform spacing of the blocks in a width and height direction. Each connector comprises a pair of rigid, elongated members each having a pair of spaced, planar opposite surfaces, and a laterally centered longitudinal groove in each surface. Each member is joined to the other member and each connector is disposed at an intersection of the corners of and in abutment with a plurality of blocks with each longitudinal groove engaging a ridge which extends around the circumference of each block. The connectors can be secured to the blocks with an adhesive compound, e.g., a curable silicone caulking composition, and the spaces between the blocks can be filled with mortar, grout or caulking material to seal the wall or panel and embed and conceal the connectors in the mortar. The glass blocks can be laid up in either the "regular stack-up" configuration in which glass blocks are usually laid up in straight, horizontal courses and vertical tiers; or in an "overlapping" configuration in which glass blocks are laid overlapping as in the case of bricks.

36 Claims, 5 Drawing Sheets

GLASS BLOCK PANEL CONSTRUCTION AND DEVICE FOR USE IN SAME

CROSS - REFERENCE TO RELATED APPLICATIONS

This is a continuation-in-part of application Ser. No. 863,664 filed May 15, 1986 now U.S. Pat. No. 4,774,793 which in turn is a continuation-in-part of application Ser. No. 843,483, filed Mar. 24, 1983, abandoned.

TABLE OF CONTENTS

Cross—References to Related Applications
Background of The Invention
Technical Field
Description of Related Art
Summary Of The Invention
Description of the Drawings
Description of the Preferred Embodiments

BACKGROUND OF THE INVENTION

1. Technical Field

This invention relates to walls or panels of glass blocks and to devices and methods used in constructing such walls or panels. More particularly, the invention relates to architectural glass block walls or panels containing connectors which facilitate construction and provide enhanced structural integrity and strength to the wall or panel. The terms "wall" and "panel" are used interchangeably herein and each connotes the other as well as partitions, windows and other structures for which architectural glass blocks have heretofore been used.

2. Description of Related Art

Glass blocks are architecturally favored as a construction material from the standpoint of their usefulness in forming panels having an aesthetically pleasing appearance, thermal and sound insulating ability, weather resistance coupled with low maintenance requirements, resistance to vandalism and forced entry, and ability to transmit light to virtually any desired degree to provide optimum illumination.

Most commonly used glass blocks, and the ones to which this invention applies, are formed by fusing together two halves of pressed glass which results in an upstanding central projection or ridge around the middle of the circumference of the block. Ordinarily, glass blocks are assembled in a panel on-site using mortar, cement, grout, or caulking material as is the practice with regular bricks or cement blocks. Such panels can be also be pre-assembled elsewhere and shipped to the job site.

Unfortunately, the non-porous, non-absorbent surfaces of glass blocks do not permit the formation of a strong bond with mortar, and several schemes have been devised to overcome this drawback. For example, the circumferential surfaces of some glass blocks are roughened by the manufacturer; also, resinous coatings have been applied to such surfaces to which the mortar used in setting the blocks can better adhere.

In laying up glass blocks, greater care is needed than with bricks or other types of masonry. Glass blocks are usually laid up in straight, horizontal courses and vertical tiers rather than overlapping as in the case of bricks, and it is important architecturally, aesthetically and structually, that the blocks be uniformly spaced, both horizontally and vertically. Also, because glass blocks are relatively heavy and since they do not absorb water from the mortar as do bricks or concrete blocks, the mortar should be used in a firmer mix to support the weight of the blocks. Moreover, since mortars that are suitable for use in laying glass blocks are of the type which set slowly, only a few courses of blocks can be laid up at a time; otherwise, the weight of freshly laid blocks will tend to squeeze out the mortar between the lower courses, thus making it difficult to align the glass blocks properly. Special fast-setting mortars are sometimes used in order to try to avoid this problem, but this is less desirable from a structural standpoint.

For all of these reasons, glass block panels, despite their architectural advantages, are often avoided by builders and others who must pay the relatively high labor cost in constructing them.

A number of efforts have been made over the years to facilitate the construction of glass block panels. These efforts generally have been aimed at providing spacing and reinforcement in the form of pins, spacers, anchors, and the like as shown in U.S. Pat. Nos. 1,798,088; 1,868,236; 2,112,241; 2,227,842; 2,239,537; 2,527,985; 3,295,281; and 4,058,943. However, none of these methods has gained acceptance in the architectural profession or building trades, either because such methods are not applicable to glass blocks of conventional design, or because their use requires the exercise of skill beyond that possessed by the typical mason, or because they just don't work well enough or are not economical enough to justify their commercial use.

A need therefore exists for an innovative means to facilitate the laying of glass blocks, and for glass block panels and a method for constructing such panels which are more economical and of better quality than were previously attainable.

Accordingly, it is an object of present invention to provide a means for facilitating the laying of glass blocks to form panels.

Another object is to provide glass block panels of novel and improved construction compared to glass block panels made previously.

Yet another object is to provide a novel method for constructing glass block panels which is faster, easier and more economical than methods heretofore used and which results in the advantageous glass block panels of the present invention.

These and other objects of the invention as well as a fuller understanding of the advantages thereof, can be had by reference to the following description and claims.

SUMMARY OF THE INVENTION

The foregoing objects are achieved according to the present invention one aspect of which is a connector for glass blocks for use in forming an architectural wall or panel of said blocks. The connectors are inserted between the blocks as they are laid up and provide securement in a width and height direction. The connectors impart a structural rigidity, resilience and reinforcement to the panel complementary to the mortar so that the courses and tiers of blocks can be more readily secured in accurate alignment and with uniform spacing.

In one of its forms wherein the connector can be used in constructing flat walls or panels, the connector comprises a pair of rigid, interlocked, elongated, rectilinear members. Each member has two spaced, parallel, planar opposite surfaces, a longitudinal groove in each surface, and an open slot perpendicular to the longitudinal direction and extending to the lateral center of the member. (As used herein, term "surface" includes a surface as such, as well as elements which define such surfaces as illustrated, for example, in FIGS. 5 and 6). Each member can thus be disposed or fitted within the slot of the other member. Preferably, the grooves in each member are laterally centered, i.e., each groove is centered relative to the width of the member.

There are two methods by which the glass blocks can be laid up. The first method is the "regular stack-up" configuration in which glass blocks are laid up in straight, horizontal courses and vertical tiers. In such a configuration, when the connector is to be used to join four blocks at a common intersection, e.g., within the boundaries of the wall or panel, the slot in each member is preferably longitudinally centered, i.e., is located midway along the length of the member. When the connector is to be used to join two blocks at a common intersection, e.g., along the edge of the panel where it meets a sill or jamb, the slot in one of the members should be located at or near the end of the member and the slot in the other member is preferably directed midway along the length of the member (i.e., longitudinally centered) so that the connector has a "T" configuration. The second method is the "overlapping" configuration in which glass blocks are laid up overlapping as in the case of bricks. In such "overlapping" configuration, when the connector is to be used to join three blocks at a common intersection, e.g., within the boundaries of the wall or panel or join two blocks at a common intersection, e.g., along the edge of the panel where it meets a sill or jamb, the slot in one of the members should be located at or near the end of the member and the slot in the other member is preferably directed midway along the length of the member (i.e., longitudinally centered) so that the connector has a "T" configuration.

Another form of the connector, which is particularly useful in constructing glass block walls or panels which are curved, comprises a pair of rigid, interlocked, elongated members one of which has two spaced, parallel planar opposite surfaces; the other member is tapered in the sense that it has two spaced, nonparallel, laterally converging, planar opposite surfaces. Each member has a longitudinal groove, preferably laterally centered, in each surface and an open slot, as described in the preceding paragraph. Each member can thus be disposed or fitted within the slot of the other member.

The connector can be made of any rigid material (e.g., wood, plastic, metal, glass, ceramic). Among these materials, plastics, e.g., polystyrene, rubber-modified polystyrene (also known as "impact polystyrene" or "high impact polystyrene"), polycarbonate, acrylic, nylon, and the like, are preferred because of their desirable mechanical properties (e.g., stiffness and compressive strength), resistance to decomposition, availability in a variety of colors and degrees of transparency, and relatively low material and fabrication costs. The simple geometry of the connectors facilitates fabrication by means that will become readily apparent to those skilled in the art having the benefit of the present disclosure before them. In this regard, the connectors can be fabricated in one piece rather than as separate interlockable members, each member being thereby integrally molded with the other member to form the connector as a single article of manufacture. In the case of connectors that are made of plastic, such fabrication of the connector as a single piece can be conveniently carried out by injecting molding. Also, connectors that abut a sill or jamb can, if desired, be made conveniently from a full connector by simply cutting off half of one member; the other member, which abuts the sill or jamb, remains intact.

In another aspect of the invention, an architectural wall or panel which can be flat or curved or which can have separate flat and curved portions, comprises a plurality of uniformly spaced glass blocks each having a height, width and thickness and a ridge around the middle of its circumference, and a plurality of connectors connecting the blocks. Each connector comprises a pair of rigid, interlocked, elongated members, the length of each member being less than the shorter of the height or width of a block and the width of each member being less than the thickness of the block. The thickness of the member, i.e., the distance between its surfaces, determines the spacing between adjacent blocks. To facilitate mating of the connector with the block, the longitudinal groove in said member is at least as wide and as deep as, and preferably wider and deeper than, the width and height, respectively, of the circumferential ridge on the block, the connector being otherwise constituted as described hereinabove. The connectors are disposed or located one each at an intersection of the corners of and in abutment with a plurality of blocks. Each longitudinal groove in the connector members engages a ridge on a block to give lateral stability to the wall or panel; in the case of curved walls or panels containing connectors having a member with non-parallel surfaces, the groove in such member is perpendicular to the radius and arc of curvature of the wall or panel. Further, by using an adhesive such as a silicone caulking compound to secure the surfaces of each connector to the blocks with which they abut, an exceptional degree of flexural strength is imparted to the overall panel structure. This facilitates filling the spaces between the blocks with mortar to embed and conceal the connector within the mortar thereby to seal the wall or panel, e.g., against sound and weather.

In a third aspect of the invention, a method of forming the aforesaid wall or panel comprises connecting the blocks by interposing connectors as described hereinabove, in the spaces between and in abutment with adjacent blocks in the manner described hereinabove. It is preferred to first lay up the entire panel with glass blocks and connectors using silicone caulking compound or the like as an adhesive between the connectors and glass blocks, and thereafter apply a mortar such as Portland cement grouting to the spaces between the blocks, to complete the structure. If the mortar is applied to the glass blocks as the courses are laid, a less satisfactory result is likely because the mortar may interfere with proper mating and abutment of the connectors with the blocks.

In a fourth aspect of the invention, a method of forming in the aforesaid overlapping configuration a wall or panel comprises connecting the blocks by interposing connectors as described hereinabove, in the spaces between and in abutment with adjacent blocks in the manner described hereinbelow.

Standard sizes for glass blocks include thicknesses of $3\frac{1}{8}''$ and $3\frac{7}{8}''$, and widths and heights of $5\frac{3}{4}'' \times 5\frac{3}{4}''$ (6" nominal), $7\frac{3}{4}'' \times 7\frac{3}{4}''$ "(4"$\times$8" nominal), and $5\frac{3}{4}'' \times 7\frac{3}{4}''$ "(6"$\times$8" nominal).

It is preferred to start the first course with a half size (for example 4"$\times$8") glass block, on both ends, then with full size glass blocks (for example 8"$\times$8") between them using silicone caulking compound or the like as an adhesive between the connectors and glass blocks. The second course is then laid with all full size (for example 8"×8") glass blocks on top of the first course. The odd number courses are erected exactly the same way as the first course and the even number courses are erected exactly the same way as the second course. This method for laying out of the glass block courses continues until the entire panel with glass blocks and connectors has been laid up. Thereafter, a mortar such as Portland cement grouting is applied to the spaces between the blocks to complete the structure.

DESCRIPTION OF THE DRAWINGS

Referring to the drawings.

DESCRIPTION OF THE PREFERRED EMBODIMENTS

Figure 1A:
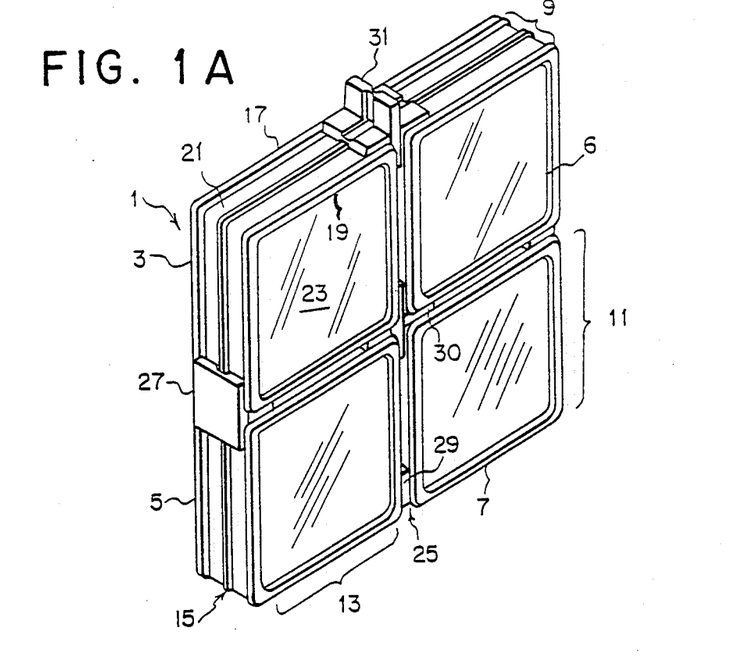
FIG. 1A is an elevational view in perspective of a representative portion of a flat wall or panel of glass block construction according to the invention.

Referring to FIG. 1A, a representative portion 1 of a flat panel is comprised of glass blocks 3, 5, 6 and 7 which are available in a variety of sizes from Pittsburgh Corning Corporation of Pittsburgh, Pennsylvania and from Westerwald AG of Wirges, Germany. The size of each block is expressed in terms of its thickness 9, height 11, and width 13. Standard sizes for glass blocks include thicknesses of $3\frac{1}{8}"$ and $3\frac{7}{8}"$ and widths and heights of $5\frac{3}{4}"\times 5\frac{3}{4}"$ (6" nominal), $7\frac{3}{4}"\times 7\frac{3}{4}"$ (8" nominal), $11\frac{3}{4}"\times 11\frac{3}{4}"$ (12" nominal), $3\frac{3}{4}"\times 7\frac{3}{4}"$ (4"×8" nominal), and $5\frac{3}{4}"\times 7\frac{3}{4}"$ (6"×8" nominal). Each block has a ridge 15 around the center of the circumference and edges 17 and 19 which extend beyond the surface 21 of the circumference. The surface 21 of the circumference usually has a resinous coating or etched texture as determined by the manufacturer for the purpose of improving the bond between the mortar and the block and to control to some extent the transmission of light through the face 23 of the block. As in conventional glass block panels, the spacing 25 between the edges of adjacent blocks and between the edges of a block and an adjacent sill or jamb is usually between about $\frac{1}{4}"$ and 162 ". In the panel of the present invention this is readily achieved by interposing between the blocks the connectors 27, 29, 30 and 31 of the present invention as shown in FIG. IA. "T" shaped connectors 27 and 29 are designed to abut against a jamb or sill; connectors 30 and 31 illustrate the joining of four blocks at a common intersection. FIG. IA. also illustrates the feature of the invention wherein the panel is constructed initially using only blocks and connectors, preferably with an adhesive self-curing silicone caulking compound applied to the surface of the members of the connectors that will abut the circumferential surfaces of the glass blocks to obtain a self-supporting structure in which the connectors are load bearing. The entire wall is thus assembled and then the mortar e.g., Portland cement grouting, is applied to fill in all the spaces between the blocks to seal the panel and to embed the connectors entirely within the mortar so that the connectors cannot be seen. Suitable mortars or grouting include those heretofore used in laying up glass blocks. An exemplary grouting is made by slurrying a mixture of 1 part by volume Portland cement, $\frac{1}{4}$ to $\frac{1}{2}$ parts by volume lime, and sand equal to between about $2\frac{1}{4}$ and 3 times the volume of cement-plus-lime. If desired, a waterproofing agent can be applied or waterproof Portland Cement can be used. Other suitable mortars, cements, grouts and caulking materials will suggest themselves to those skilled in the masonry art having the benefit of the present disclosure before them. In this regard, the fact that the length of each member constituting the connectors is less than the width or height of a glass block with which it abuts makes it possible to establish the mortar as an uninterrupted continuum or matrix throughout the panel. The finished panel is thus obtained in a fraction of the time and with a better workmanship—like appearance than glass block panels made heretofore.

Figure 3A:
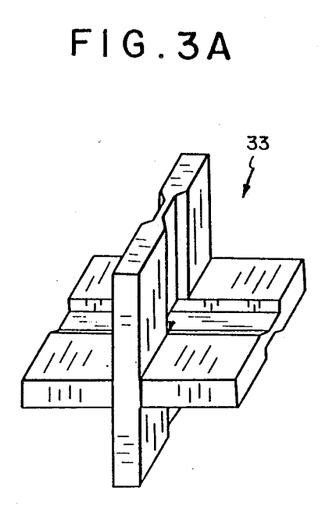
FIG. 3A is an elevational view in perspective of a connector according to the invention which is useful for constructing walls or panels of the type shown in FIG. 1.
Figure 3B:
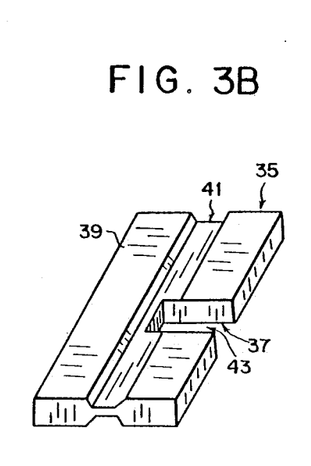
FIGS. 3B and 3C are elevational views in perspective of the two members which are fitted or interlocked to form the connector shown in FIG. 3A.
Figure 3C:
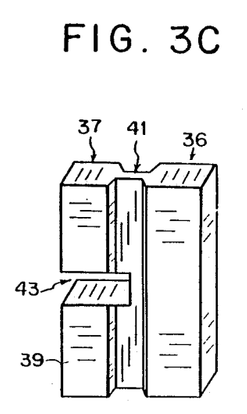

Referring to FIGS. 3A, 3B and 3C, connector 33 suitable for use in the glass block panel of FIG. 1A is comprised of identically shaped rigid, elongated, rectilinear members 35 and 36. Each member is typically about 3 inches long and about 2 inches wide and has two spaced, parallel, planar opposite surfaces 37 and 39, a longitudinal groove 41 about $\frac{1}{8}"$ deep in each surface, and an open slot 43 about $\frac{3}{8}"$ to about $\frac{1}{2}"$ wide and perpendicular to the longitudinal direction and extending to the lateral center of the member. Each member is about $\frac{3}{8}"$ or about $\frac{1}{4}"$ thick depending on the desired spacing of the blocks and corresponding to the width of the slot and can thus be disposed or fitted within the slot of the other member. As shown in FIGS. 3B and 3C, the grooves in each member are tapered (e.g., from about $\frac{1}{2}$ to about $\frac{3}{8}"$ for better engagement with the ridge on the block) and laterally centered, i.e., each groove is centered relative to the width of the member. Also, as shown in FIGS. 3B and 3C, when the connector is to be used to join four blocks at a common intersection, e.g., within the boundaries of the wall or panel, the slot is preferably longitudinally centered, i.e., is located midway along the length of the member. As shown by elements 25 and 27 in FIG. 1A where the connector is to be used to join two blocks at a common intersection, e.g., along the edge of the panel where it meets a sill or jamb, the slot in one of the members should be located at or near the end of the member and the slot in the other member is preferably located midway along the length of the member (i.e., longitudinally centered).

Figure 1B:
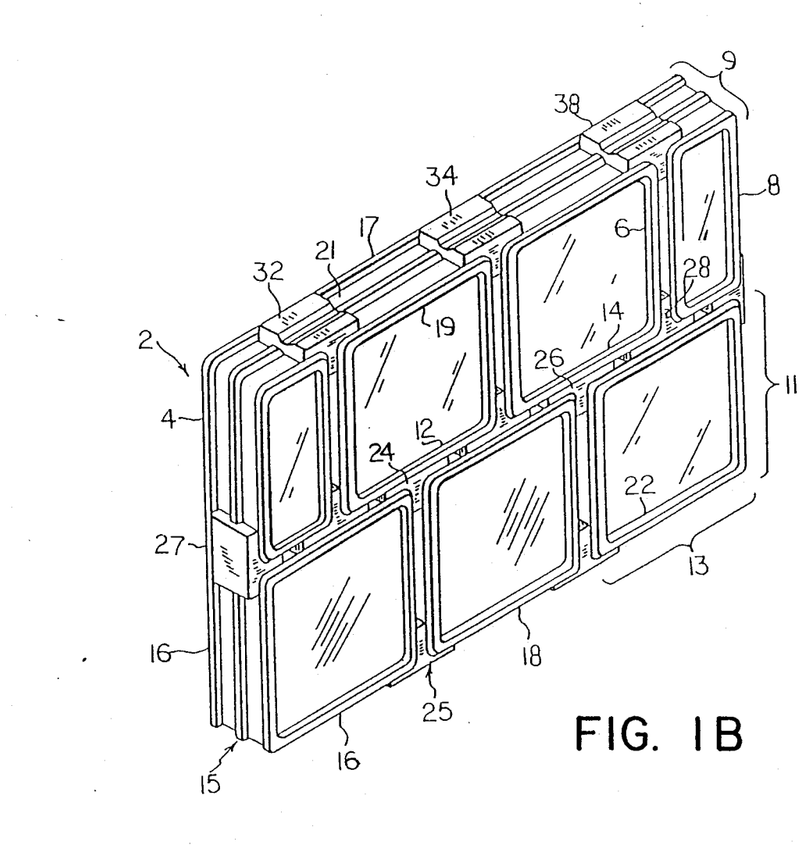
FIG. 1B is an elevational view in perspective of a representative portion of a flat wall or panel of glass block construction in an "overlapping" configuration according to the invention.

FIG. 1B illustrates two courses of a representative portion 2 of a flat wall or panel of the invention comprising glass blocks which are layed in an overlapping configuration. Such wall or panel can be constructed of the same glass blocks described above in connection with FIG. 1A except that in the odd number courses, for example, first, third, fifth, etc., half size (for example 4"×8") glass blocks 4, 8 are used on both ends with full size (for example 8"×8") glass blocks 12 and 14 between them. For the even number courses, for example, second, fourth, sixth, etc., only full size glass blocks 16, 18 and 22 are used. "T"-shaped connectors 24, 26, 28, 25 and 27 are used to join three blocks at common intersections, e.g., within the boundaries of the wall or panel. Likewise, "T"-shaped connectors 32, 34 and 38 are used to join two blocks at common intersections, e.g., along the edge of the panel where it meets a sill or jamb. The slot in one of the members should be located at or near the end of the member and the slot in the other member is preferably directed midway along the length of the member (i.e., longitudinally centered).

Figure 2:
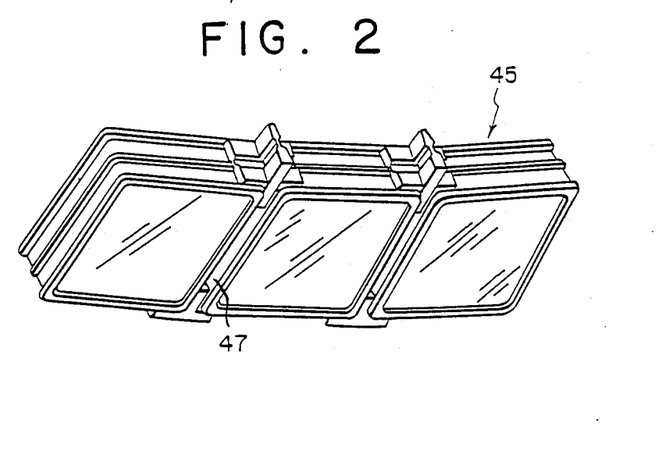
FIG. 2 is an elevational view in perspective of a representative portion of a glass block wall or panel of curved construction according to the invention.

FIG. 2 illustrates a representative portion 45 of a curved wall or panel of the invention. The curved wall can be constructed of the same glass blocks described above with regard to FIG. 1A except that the spacing 47 between blocks of adjacent vertical tiers is greater on the convex side of the panel than the corresponding spacing on the concave side. Minimum radii of curvature have been established in the building trade for the various sizes of glass blocks; such radii are generally such that the spacing between tiers on the concave side of the panel is no less than about 3/16" and no greater than about ⅜" on the convex side.

Figure 4A:
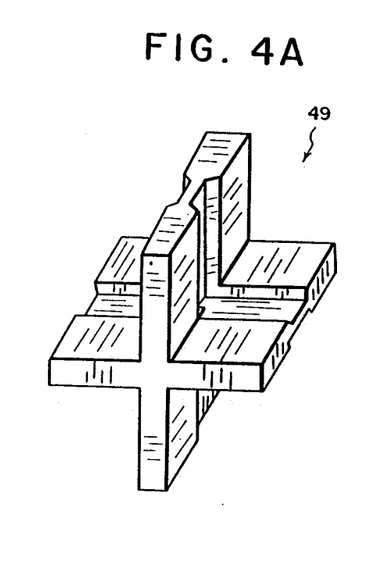
FIG. 4A is an elevational view in perspective of a connector according to the invention which is useful for constructing curved walls or panels of the type shown in FIG. 2.
Figure 4B:
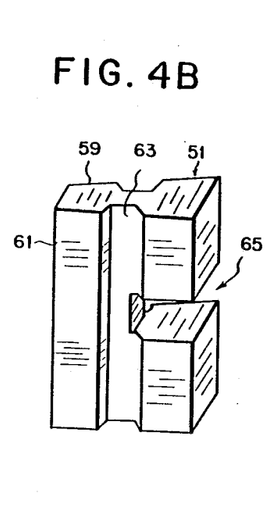
FIGS. 4B and 4C are elevational views in perspective of the two members which are fitted or interlocked to form the connector shown in FIG. 4A.
Figure 4C:
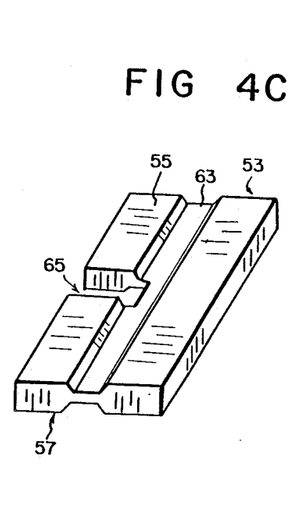

FIGS. 4A, 4B and 4C illustrate a connector 49 suitable for use in the curved glass block panel shown in FIG. 3. The connector 49 comprises a pair of rigid, interlocked, elongated members 51 and 53 one of which (53) has two spaced, parallel planar opposite surfaces 55 and 57; the other member 51 is tapered in the sense that it has two spaced, non-parallel, laterally converging, planar opposite surfaces 59 and 61. The angle of the taper matches the angle between adjacent vertical tiers of glass blocks which in turn determines the radius of curvature of the panel. Each member 51 and 53 has a longitudinal groove 63, preferably laterally centered, in each surface and an open slot 65 as described in the preceding paragraph. Each member can thus be disposed or fitted within the slot of the other member.

Figure 5:
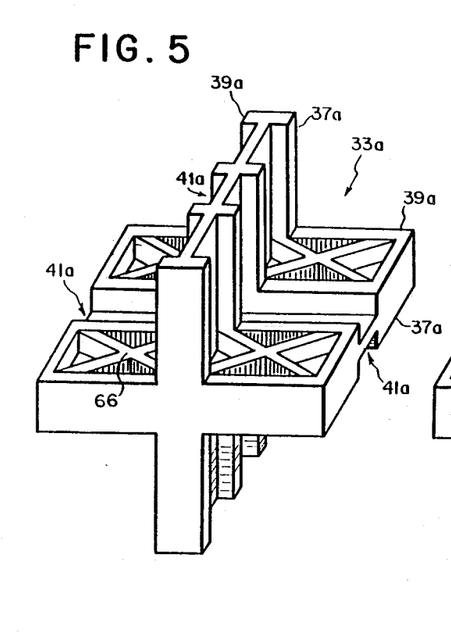
FIG. 5 is an elevational view in perspective of a connector according to the invention which is useful for constructing walls or panels of the type shown in FIG. 1 and which is injection molded as a single piece of plastic.
Figure 6:
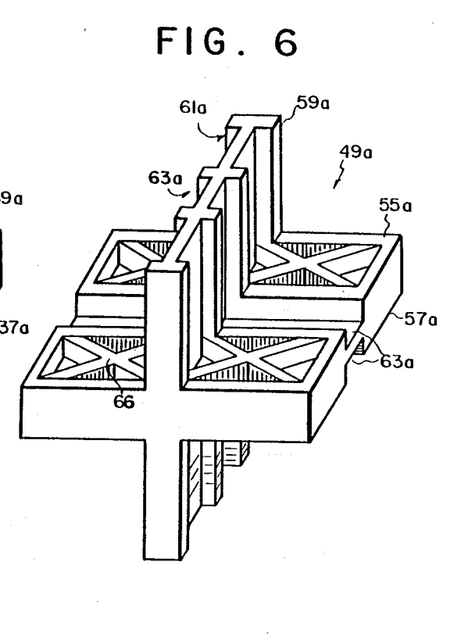
FIG. 6 is an elevational view in perspective of a connector according to the invention which is useful in constructing curved walls or panels of the type shown in FIG. 2 and which is injection molded as a single piece of plastic.

FIGS. 5 and 6 illustrate connectors of the type which can be fabricated in one piece from injection molded plastic, e.g., impact polystyrene. The element numbers in FIG. 5 bearing the suffix "a" correspond to the element numbers in FIGS. 3A-3C; the element numbers in FIG. 6 bearing the suffix "a" correspond to the element numbers in FIGS. 4A-4C. Although not shown as such, the connectors of FIGS. 5 and 6 preferably have chamfered or filleted angles and curves throughout. Connectors 33a and 49a differ from those illustrated FIGS. 3A and 4A respectively, in that they are fabricated in one piece rather than as separate interlockable members, and the surfaces are defined by element 37a, 39a, 55a, 57a, 59a and 61a rather than by entirely flat areas (as in FIGS. 3A and 4A) in order to facilitate injection molding by cutting down on the total thickness of the material. Thus, in the embodiments shown in FIGS. 5 and 6, the connectors having the dimension described hereinabove for FIGS. 3A-3C and 4A-4C would have a maximum material thickness of about ⅜". Also, the connectors are depicted in FIGS. 5 and 6 in the orientation in which they are installed between glass blocks, i.e., the cross-elements are placed horizontally to take advantage of the fact that they impart load-bearing capacity to the connector. Although not shown, the vertical members are preferably tapered slightly (e.g., about 1°) in order to facilitate removal of the connector from the injection mold in which it is formed. Also, connectors of the type shown in FIGS. 5 and 6 can be made in the form of interlockable members as shown in FIGS. 3A-3C and 4A-4C.

The foregoing description is intended to illustrate the invention, and it is understood that changes and variations can be made in the foregoing embodiments without departing from the spirit and scope of the invention which is defined in the following claims.

I claim:

1. A connector for glass blocks for use in forming a panel of said blocks, comprising a pair of rigid, interlocked, elongated, rectilinear members each member having but two spaced, parallel planar opposite surfaces, a longitudinal groove in each surface, and an open slot perpendicular to the longitudinal direction and extending to the lateral center of the member, the slot of each member being interlockably disposed within the slot of the other member, said connector being further characterized in that each member is adopted to extend no further than the center of a side of a block on which said member abuts.

2. A connector according to claim 1 wherein the grooves are laterally centered.

3. A connector according to claim 2 wherein the slot in each member is longitudinally centered.

4. A connector according to claim 2 wherein the slot in one member is located near the end of said member and the slot in the other member is longitudinally centered.

5. A panel comprising:
   a plurality of uniformly spaced glass blocks each having a height, width and thickness and a ridge around its circumference; and
   a plurality of connectors for said blocks, each connector comprising a pair of rigid, interlocked, elongated rectilinear members, each member abutting the height or width of each of at least two adjacent blocks the length of each member being less than said height or width and the lateral width of each member being less than the thickness of the block, said member having but two spaced, parallel, planar opposite surfaces, a longitudinal groove in each surface at least as wide and as deep as the width and height, respectively, of the ridge on the block, and an open slot perpendicular to the longitudinal direction and extending to the lateral center of the member, each member being interlockably disposed within the slot of the other member, and each connector being disposed at an intersection of the corners of and in abutment with a plurality of blocks with each longitudinal groove engaging the ridge on a block, said connector being further characterized in that each member of a connector extends no further than the center of a side of a block on which said member abuts.

6. A panel according to claim 5 wherein the connectors are secured to the blocks with an adhesive.

7. A panel according to claim 6 wherein the spaces between the blocks are filled with mortar.

8. A method of forming a panel of uniformly spaced glass blocks each having a height, width and thickness and a ridge around its circumference, comprising connecting the blocks by interposing in the space between and in contact with adjacent blocks a connector comprising a pair of rigid, interlocked, elongated rectilinear members, each member abutting the height or width of each of at least two adjacent blocks, the length of each member being less than said height or width and the lateral width of each member being less than the thickness of the block, each member having but two spaced, parallel, planar opposite surfaces, a longitudinal groove in each surface at least as wide and as deep as the width and the height, respectively, of the ridge on the block, and an open slot perpendicular to the longitudinal direction and extending to the lateral center of the member, and each member being interlockably disposed within the slot of the other member, each connector being disposed at an intersection of the corners of and in abutment with two or more blocks with each longitudinal groove engaging the ridge on a block, said connectors being further characterized in that each member of a connector extends no further than the center of a side of a block on which said member abuts.

9. A method according to claim 8 wherein the connectors are secured to with the blocks by an adhesive.

10. A method according to claim 9 including the step of filling the spaces between the blocks with mortar.

11. A connector for glass blocks for use in forming a panel of said blocks, comprising a pair of rigid, elongated, unitary rectilinear members each member having but two spaced, parallel planar opposite surfaces, and a longitudinal groove in each surface, each member being integrally molded with the other member to form the connector as a single article, said connector being further characterized in that each member of a connector extends no further than the center of the side of a block on which said member abuts.

12. A connector according to claim 1 wherein the grooves are laterally centered.

13. A panel comprising:
a plurality of uniformly spaced glass blocks each having a height, width and thickness and a ridge around its circumference; and
a plurality of connectors for said blocks, each connector comprising a pair of rigid, elongated, unitary rectilinear members, each member abutting the height or width of each of at least two adjacent blocks the length of each member being less than said height or width and the lateral width of each member being less than the thickness of the block, said member having but two spaced, parallel, planar opposite surfaces, and a longitudinal groove in each surface at least as wide and as deep as the width and height, respectively, of the ridge on the block, each member being integrally molded with the other member to form the connector as a signal article, and each connector being disposed at an intersection of the corners of and in abutment with a plurality of blocks with each longitudinal groove engaging the ridge on a block, said connector being further characterized in that each member of a connector extends no further than the center of the side of a block on which said member abuts.

14. A panel according to claim 5 wherein the connectors are secured to the blocks with an adhesive.

15. A panel according to claim 6 wherein the spaces between the blocks are filled with mortar.

16. A method of forming a panel of uniformly spaced glass blocks each having a height, width and thickness and a ridge around its circumference, comprising connecting the blocks by interposing in the space between and in abutment with adjacent blocks a connector comprising a pair of rigid, unitary elongated members each member abutting the height or width of each of at least two adjacent blocks, the length of said member being less than said height or width and the lateral width of each member being less than the thickness of the block, one member having but two spaced, planar parallel, opposite surfaces and the other member having but two spaced, non-parallel laterally converging planar surfaces, each member having a longitudinal groove in each surface at least as wide and as deep as the width and the height, respectively, of the ridge on the block, each member being integrally molded with the other member to form the connector as a single article, each connector being disposed at an intersection of the corners of and in abutment with two or more blocks with each longitudinal groove engaging the ridge on a block, and the longitudinal groove in the member of each connector that has non-parallel surfaces being perpendicular to the radius and are of curvature of the panel, said connector being further characterized in that each member of a connector extends no further than the center of the side of a block on which said member abuts.

17. A method according to claim 8 wherein the connectors are secured to the blocks by an adhesive.

18. A method according to claim 9 including the step of filling the spaces between the blocks with mortar.

19. A connector for glass blocks for use in forming a panel of said blocks in an overlapping configuration, comprising a pair of rigid, interlocked, elongated, rectilinear members each member having but two spaced, parallel planar opposite surfaces, a longitudinal groove in each surface, and an open slot perpendicular to the longitudinal direction and extending to the lateral center of the member, the slot of each member being interlockably disposed within the slot of the other member, said connector being further characterized in that each member is adopted to extend no further than the center of a side of a block on which said member abuts.

20. A connector according to claim 19 wherein the grooves are laterally centered.

21. A connector according to claim 20 wherein the slot in each member is longitudinally centered.

22. A connector according to claim 20 wherein the slot in one member is located near the end of said member and the slot in the other member is longitudinally centered.

23. A panel comprising:
a plurality of glass blocks in an overlapping configuration each having a height, width and thickness and a ridge around its circumference; and
a plurality of connectors for said blocks, each connector comprising a pair of rigid, interlocked, elongated rectilinear members, each member abutting the height or width of each of at least two adjacent blocks the length of each member being less than said height or width and the lateral width of each member being less than the thickness of the block, said member having but two spaced, parallel, planar opposite surfaces, a longitudinal groove in each surface at least as wide and as deep as the width and height, respectively, of the ridge on the block, and an open slot perpendicular to the longitudinal direction and extending to the lateral center of the member, each member being interlockably disposed within the slot of the other member, and each connector being disposed at an intersection of the corners of and in abutment with a plurality of blocks with each longitudinal groove engaging the ridge on a block, said connector being further characterized in that each member of a connector extends no further than the center of a side of a block on which said member abuts.

24. A panel according to claim 23 wherein the connectors are secured to the blocks with an adhesive.

25. A panel according to claim 24 wherein the spaces between the blocks are filled with mortar.

26. A method of forming a panel of glass blocks in an overlapping configuration each having a height, width and thickness and a ridge around its circumference, comprising connecting the blocks by interposing in the space between and in contact with adjacent blocks a connector comprising a pair of rigid, interlocked, elongated rectilinear members, each member abutting the height or width of each of at least two adjacent blocks, the length of each member being less than said height or width and the lateral width of each member being less than the thickness of the block, each member having but two spaced, parallel, planar opposite surfaces, a longitudinal groove in each surface at least as wide and as deep as the width and the height, respectively, of the ridge on the block, and an open slot perpendicular to the longitudinal direction and extending to the lateral center of the member, and each member being interlockably disposed within the slot of the other member, each connector being disposed at an intersection of the corners of and in abutment with two or more blocks with each longitudinal groove engaging the ridge on a block, said connectors being further characterized in that each member of a connector extends no further than the center of a side of a block on which said member abuts.

27. A method according to claim 26 wherein the connectors are secured to with the blocks by an adhesive.

28. A method according to claim 27 including the step of filling the spaces between the blocks with mortar.

29. A connector for glass blocks for use in forming a panel of said blocks in an overlapping configuration, comprising a pair of rigid, elongated, unitary rectilinear members each member having but two spaced, parallel planar opposite surfaces, and a longitudinal groove in each surface, each member being integrally molded with the other member to form the connector as a single article, said connector being further characterized in that each member of a connector extends no further than the center of the side of a block on which said member abuts.

30. A connector according to claim 19 wherein the grooves are laterally centered.

31. A panel comprising:

a plurality of glass blocks in an overlapping configuration each having a height, width and thickness and a ridge around its circumference; and a plurality of connectors for said blocks, each connector comprising a pair of rigid, elongated, unitary rectilinear members, each member abutting the height or width of each of at least two adjacent blocks the length of each member being less than said height or width and the lateral width of each member being less than the thickness of the block, said member having but two spaced, parallel, planar opposite surfaces, and a longitudinal groove in each surface at least as wide and as deep as the width and height, respectively, of the ridge on the block, each member being integrally molded with the other member to form the connector as a signal article, and each connector being disposed at an intersection of the corners of and in abutment with a plurality of blocks with each longitudinal groove engaging the ridge on a block, said connector being further characterized in that each member of a connector extends no further than the center of the side of a block on which said member abuts.

32. A panel according to claim 23 wherein the connectors are secured to the blocks with an adhesive.

33. A panel according to claim 24 wherein the spaces between the blocks are filled with mortar.

34. A method of forming a panel of glass blocks in an overlapping configuration, each having a height, width and thickness and a ridge around its circumference, comprising connecting the blocks by interposing in the space between and in abutment with adjacent blocks a connector comprising a pair of rigid, unitary elongated members each member abutting the height or width of each of at least two adjacent blocks, the length of said member being less than said height or width and the lateral width of each member being less than the thickness of the block, one member having but two spaced, planar parallel, opposite surfaces and the other member having but two spaced, nonparallel laterally converging planar surfaces, each member having a longitudinal groove in each surface at least as wide and as deep as the width and the height, respectively, of the ridge on the block, each member being integrally molded with the other member to form the connector as a single article, each connector being disposed at an intersection of the corners of and in abutment with two or more blocks with each longitudinal groove engaging the ridge on a block, and the longitudinal groove in the member of each connector that has non-parallel surfaces being perpendicular to the radius and are of curvature of the panel, said connector being further characterized in that each member of a connector extends no further than the center of the side of a block on which said member abuts.

35. A method according to claim 26 wherein the connectors are secured to with the blocks by an adhesive.

36. A method according to claim 27 including the step of filling the spaces between the blocks with mortar.

* * * * *